United States Patent [19]

Furuhata et al.

[11] Patent Number: 4,972,335

[45] Date of Patent: Nov. 20, 1990

[54] VIDEO SIGNAL RECORDING AND REPRODUCING APPARATUS AND METHOD SUITABLE FOR RECORDING VIDEO SIGNALS INCLUDING HORIZONTAL SCANNING LINE SIGNALS

[75] Inventors: Takashi Furuhata; Hiroaki Takahashi, both of Yokohama, Japan

[73] Assignee: Hitachi, Ltd., Tokyo, Japan

[21] Appl. No.: 298,898

[22] Filed: Jan. 19, 1989

[30] Foreign Application Priority Data

Jan. 29, 1988 [JP] Japan .................................. 63-17033

[51] Int. Cl.$^5$ .............................................. H04N 5/76
[52] U.S. Cl. ...................................... 360/9.1; 360/33.1
[58] Field of Search ....................... 360/37.1, 36.1, 9.1, 360/22, 32, 33.1; 358/319, 320, 314, 326, 310, 335

[56] References Cited

U.S. PATENT DOCUMENTS

| | | | |
|---|---|---|---|
| 4,463,877 | 7/1984 | Hashimoto et al. | 360/37 |
| 4,525,752 | 6/1985 | Watanbe et al. | 360/32 |
| 4,549,227 | 10/1985 | Hashimoto et al. | 360/32 |
| 4,633,330 | 12/1986 | Yamamitsu et al. | 360/32 |

FOREIGN PATENT DOCUMENTS

| | | |
|---|---|---|
| 86994 | 5/1985 | Japan . |
| 163577 | 8/1985 | Japan . |
| 217787 | 10/1985 | Japan . |
| 49582 | 3/1986 | Japan . |
| 49583 | 3/1986 | Japan . |

*Primary Examiner*—Robert L. Richardson
*Attorney, Agent, or Firm*—Antonelli, Terry, Stout & Kraus

[57] ABSTRACT

Video signals within one vertical scanning period are divided into a plurality of line block signals. These line block signals are shifted on time base, and a redundant interval ($\tau_H$) is formed between two line block signals. Further, a plurality of segment signals, each of which includes a plurality of line block signals, are formed. A redundant interval ($\tau_S$) is formed between two segment signals. The interval of the vertical blanking signal is shortened. Recorded video signals comprise the redundant intervals ($\tau_S$) and the segment signals including the redundant intervals ($\tau_H$) and the line block signals. A horizontal synchronizing signal of negative polarity, for example, is added in the redundant interval ($\tau_H$). Magnetic heads are switched in the redundant interval ($\tau_S$).

24 Claims, 9 Drawing Sheets

FIG. 9
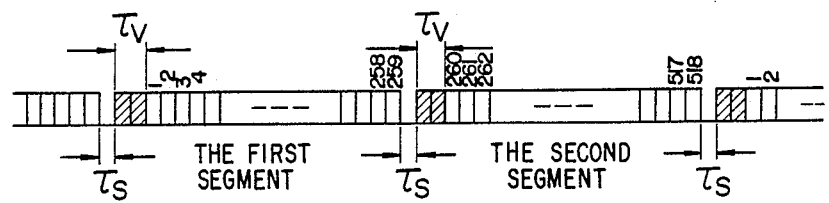
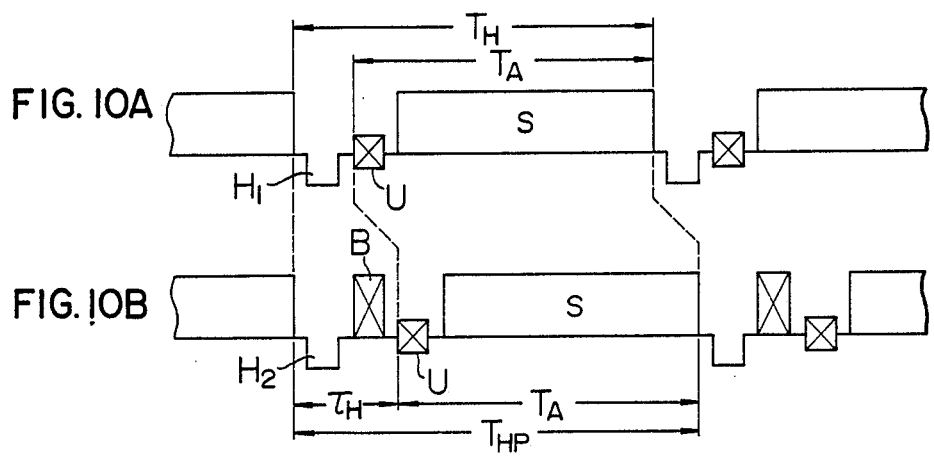
FIG. 10A
FIG. 10B

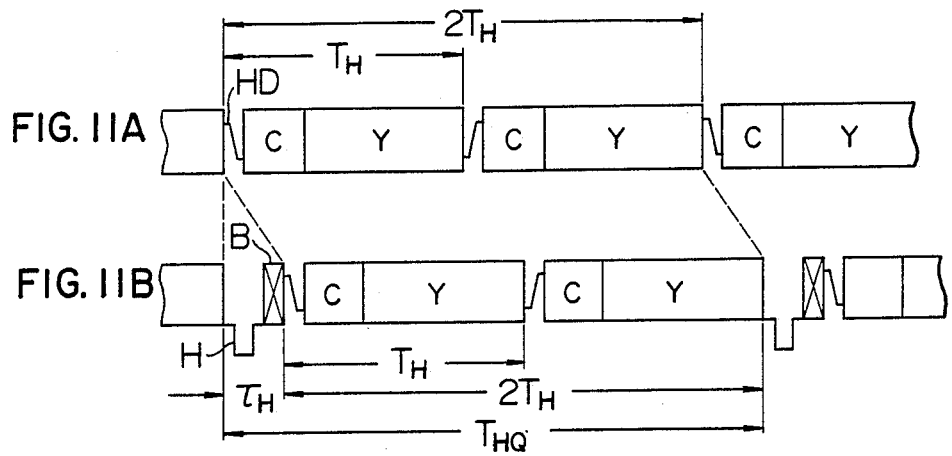
FIG. 11A
FIG. 11B
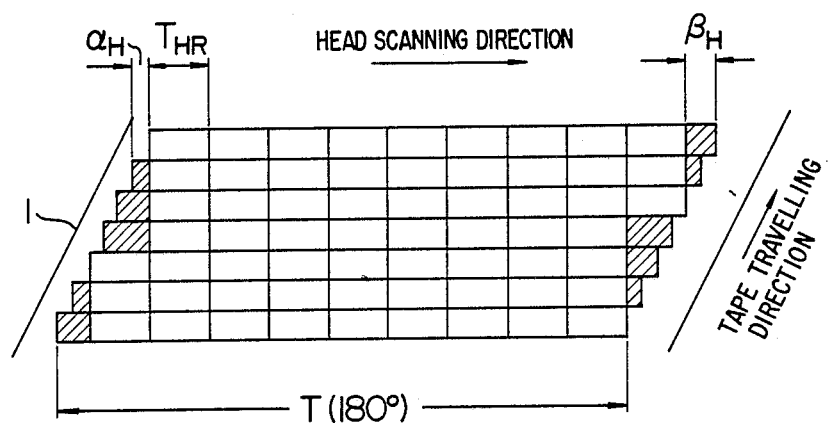
FIG. 12

VIDEO SIGNAL RECORDING AND REPRODUCING APPARATUS AND METHOD SUITABLE FOR RECORDING VIDEO SIGNALS INCLUDING HORIZONTAL SCANNING LINE SIGNALS

BACKGROUND OF THE INVENTION

The present invention relates to a method and apparatus for recording and reproducing video signals, and in particular to a video signal recording method, a video signal reproducing method, and a video signal recording and reproducing apparatus capable of reproducing video signals with high fidelity and correcting the time base with high precision.

As a transmission system for transmitting high definition television signals, an MUSE (Multiple Sub-nyquist sampling Encoding) system disclosed in JP-A-60-86994 and JP-A-60-163577, for example, is known. Apparatuses for recording and reproducing video signals transmitted by the MUSE system are disclosed in JP-A-60-217787, JP-A-61-49582 and JP-A-61-49583, for example.

In the above described MUSE system, color signals are compressed on a time base, and a time-division-multiplexed during a horizontal blanking interval of the luminance signal. Further, a horizontal synchronizing signal of positive polarity is inserted, and video signals including a luminance signal, color signals and synchronizing signals are transmitted.

In a conventional recording and reproducing apparatus for recording and reproducing the video signal having such a horizontal synchronizing signal of positive polarity, the horizontal synchronizing signal of positive polarity is removed or the video signal is compressed on time base, for example to form a redundant portion comprising the resultant blank time. Into the redundant portion, synchronizing information such as a horizontal synchronizing signal of negative polarity and a burst signal is added. As a result, video signals can be recorded and reproduced.

In the above described prior art, the structure of inputted video signals is transformed. In reproducing and reconstructing normal video signals, therefore, difficulty of some degree is caused. Since processing of time base compression of video signals is performed, the frequency band of the video signals to be recorded is widened, and wide-band signal recording and reproducing apparatuses are demanded.

SUMMARY OF THE INVENTION

An object of the present invention is to provide a recording and reproducing apparatus capable of recording and reproducing signals with high fidelity and correcting the time base with high precision even for video signals having horizontal synchronizing signals of positive polarity and further even for video signals of the NTSC system, PAL system or SECAM system, without deteriorating the characteristics possessed by original video signals and without widening the occupied frequency bandwidth.

In one embodiment of the present invention, an unnecessary redundant portion of a vertical blanking interval included in a video signal is removed, and N line block signals are formed by handling a single or a plurality of horizontal scanning, line signals of a video signal as one unit. The above described signals of the line block unit are shifted on a time base so that a first redundant interval having a predetermined width may be generated between line block signals. The total sum of the first redundant intervals per field (or frame) is so defined as not to exceed the vertical blanking interval of the above described input video signal per field (or frame). Further, synchronizing information signals such as a horizontal synchronizing signal and a burst signal are added in the first redundant interval thus generated, and then the signals are recorded and reproduced.

Further, in another embodiment of the present invention, signals of one vertical scanning interval comprising N line block signals are further divided into n segments (where n is an integer) and recorded. N line block signals are divided into n segment block signals, and respective segment signals are shifted on a time base to generate second redundant intervals having predetermined widths between segment signals. The above described second redundant interval and the above described first redundant interval are so defined that the total sum of them per field (or frame) may not exceed the vertical blanking interval of the above described input video signal per field (or frame). A segment synchronizing information signal such as a vertical synchronizing signal of negative polarity is inserted into at least a portion of the second redundant interval, or the above described line synchronizing information signal is inserted into a top portion thereof. Signals having the first and second redundant intervals are recorded. When the above described respective segment signals are reproduced, joint processing of signals is performed in the second redundant interval. After a recorded signal has been reproduced, the reproduced video signal undergoes time base conversion. The above described first and second redundant intervals are entirely removed, and the original continuous video signals are reconstructed.

Since the above described first and second redundant intervals are entirely furnished by time contained in a vertical blanking signal, which is an unnecessary redundant interval, the necessary information portion of the original video signal is entirely recorded, resulting in signal reproduction with fidelity. Further, since the synchronizing information signal suited to the characteristics of the recording and reproducing apparatus is inserted and then signal recording is performed, this synchronizing information signal is reproduced and separated stably and certainly. By using the synchronizing information signal thus separated as a reference signal, time base conversion of the above described line block signal or segment signal is performed with high precision, and the original video signals are correctly reconstructed with fidelity. Further, since the time base compression of the original video signals is not performed in the above described time base conversion process, the occupied frequency bandwidth of the recorded video signals is not increased and the S/N deterioration in the reproduced signals is not caused, resulting in stable and fine reproduced signals.

BRIEF DESCRIPTION OF THE DRAWINGS

FIGS. 9, 10 and 11 are waveform diagrams showing other video signal forms according to the present invention.

FIG. 12 is a pattern diagram showing another tape pattern according to the present invention.

DESCRIPTION OF THE PREFERRED EMBODIMENTS

Embodiments of the present invention will now be described in detail.

Figure 1:
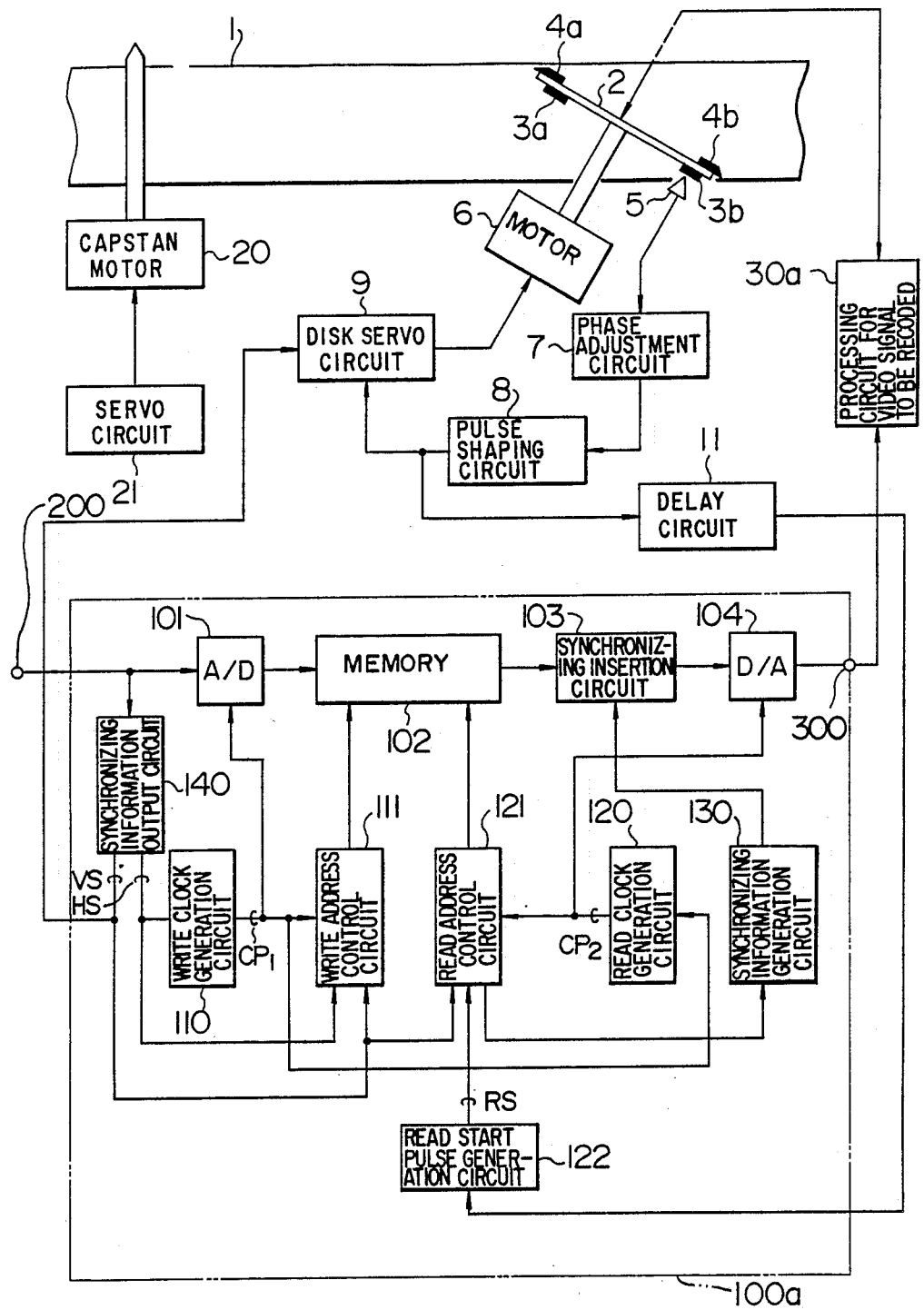
FIG. 1 is a block diagram showing an embodiment of a video signal recording apparatus according to the present invention.
Figure 2:
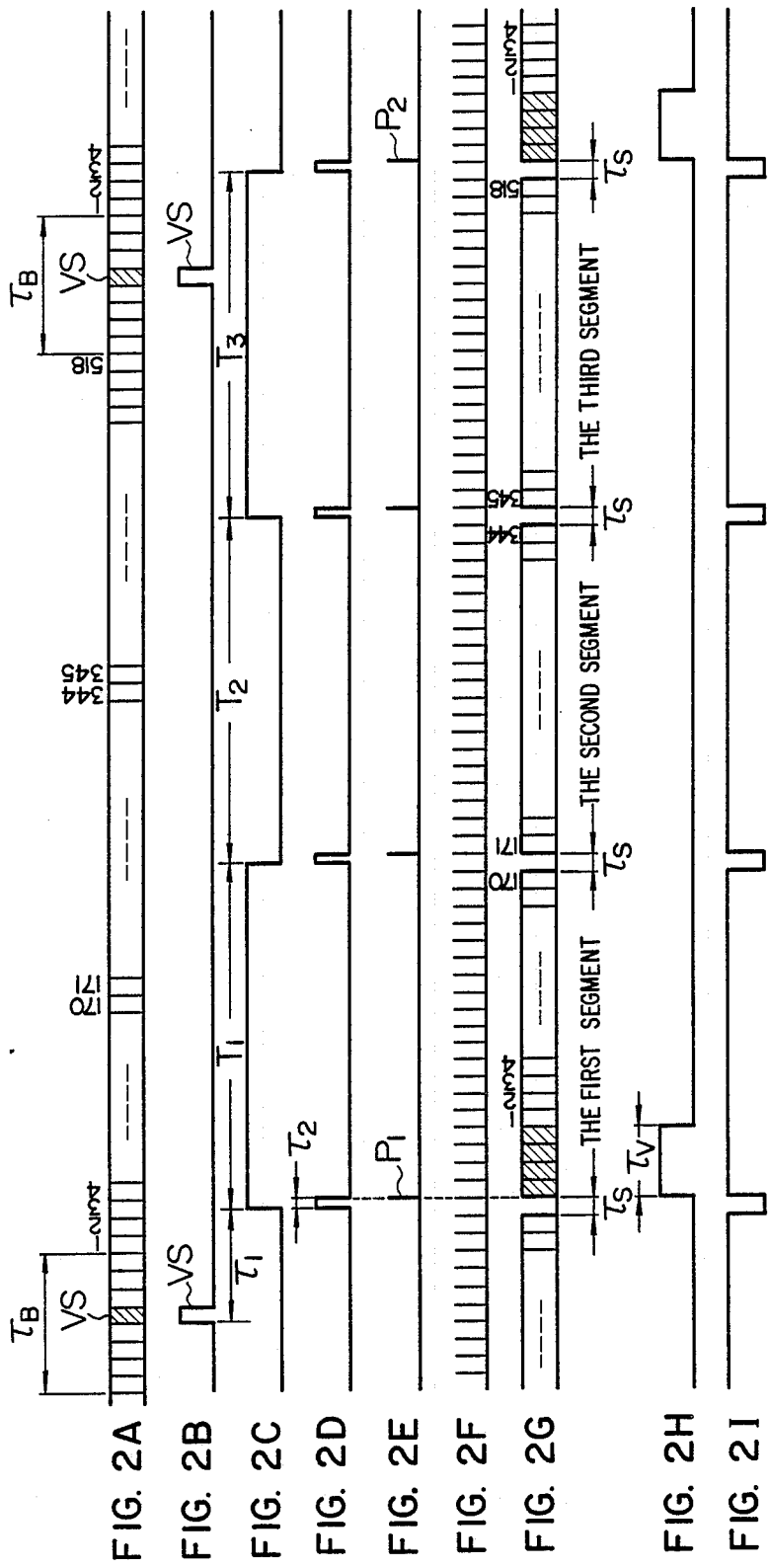
FIGS. 2A to 2I are waveform diagrams showing waveforms of respective portions of the apparatus illustrated in FIG. 1.

FIG. 1 is a block diagram showing a video signal recording apparatus used when the present invention is applied to a video tape recorder of two-head helical scan type. FIG. 2 shows waveforms of respective portions of the apparatus illustrated in FIG. 1. FIGS. 3A to 3D are waveform diagrams of video signals to be recorded. FIG. 4 is a schematic diagram showing the pattern of tracks formed on magnetic tape.

In FIG. 1, magnetic tape 1 which is a recording medium is caused to travel by a capstan motor 20. The capstan motor 20 is controlled by a capstan servo circuit 21. Magnetic heads 4a and 4b have different azimuth angles. The magnetic heads 4a and 4b are mounted on a disk 2 at an angle interval of 180°, and are rotated together with the disk 2 by a disk motor 6. The tape 1 is wound around the disk 2 with an angle larger than 180°. Therefore, a portion of the tape 1 is simultaneously scanned by the heads 4a and 4b. A so-called overlap portion on tracks shown in portions $Q_1$ and $Q_2$ of FIG. 4 is formed on the tape 1. Two magnets 3a and 3b are mounted on the disk 2 at an angle interval of 180°. Magnetic flux generated by the magnets 3a and 3b is detected by a tachometer head 5, and a tachometer pulse synchronized to rotation of the heads 4a and 4b is obtained from the tachometer head 5. The tachometer pulse obtained from the tachometer head 5 is supplied to a phase adjustment circuit 7, where the phase of the tachometer pulse is so adjusted that the heads 4a and 4b may have predetermined relative relationship with respect to the tape 1. The output signal of the phase adjustment circuit 7 is supplied to a pulse shaping circuit 8. A pulse signal, i.e., a head changeover signal (FIG. 2C) having a duty factor of 50% and synchronized to rotation of the heads 4a and 4b is outputted from the pulse shaping circuit 8. On the basis of an input video signal supplied to a terminal 200 (FIG. 2A), a synchronizing information output circuit 140 produces a vertical synchronizing information signal contained therein such as a vertical synchronizing information signal VS contained in a vertical blanking interval $\tau_B$ of FIG. 2A and represented by a shaded region, and a horizontal synchronizing information signal HS (not illustrated) such as a horizontal synchronizing signal or a burst signal. The vertical synchronizing information signal VS (FIG. 2B) fed from the synchronizing information output circuit 140 is supplied to a disk servo circuit 9 as a servo reference signal when a video signal is recorded. In this disk servo circuit 9, the phase of the vertical synchronizing information signal fed from the above described synchronizing information output circuit 140 is compared with the phase of the head changeover signal fed from the above described pulse shaping circuit 8 to output an error signal corresponding to the phase difference between them. The error signal is supplied to the disk motor 6. As a result, rotation of the disk motor 6 is so controlled that the above described vertical synchronizing information signal VS may be in phase synchronism with the head changeover signal, and more concretely that the phase difference time between the vertical synchronizing information VS (FIG. 2B) and the head changeover signal (FIG. 2C) may become $\tau_1$ as shown in FIG. 2.

When, in general, signals of n segments are recorded, i.e., when video signals of one field are divided into n and the divided signals are recorded into n separate tracks, the number of revolutions M of the disk motor 6 in the above described video tape recorder of two head type shown in FIG. 1 is so defined by the disk servo circuit 9 as to satisfy the relation.

$$M = \frac{f_0}{2} \times n \text{(rps)} \tag{1}$$

where $f_0$ is the field frequency of video signals.

As an example of application of the apparatus of the embodiment shown in FIG. 1 to high definition television systems, a 3-segment recording apparatus with $f_0 = 60$ Hz and $n = 3$ and hence $M = 90$ rps from the above described equation (1) will now be described.

In this case, the number $X_0$ of horizontal scanning lines of video signals which can be recorded in one track interval (interval indicated by $T_1$, $T_2$ and $T_3$ of FIG. 2B and T of FIG. 4) is given by $$X_0 = \frac{N_0}{n} \tag{2}$$

where $N_0$ is the number of line signals per field of video signals. In case of a high definition television system having 562.5 horizontal scanning lines per field (or having 1,125 horizontal scanning lines per frame), the number $X_0$ of lines is given by the relation $$X_0 = 187.5 \tag{3}$$

In accordance with the present invention, video signals of X or less lines are recorded in an interval of the lengthwise direction of each track as described later, where X is the largest integer which does not exceed $X_0$. In case of the above described equation (3), video signals of $X = 187$ or less lines are recorded. In the period T, the magnetic heads 4a and 4b are rotated by 180°.

In the embodiment shown in FIG. 1, the number of effective lines of video signals of the high definition television system inputted to the terminal 200 per field with the exception of the vertical blanking interval $\tau_B$ is 518, and the number $N_1$ of lines is so chosen as to satisfy the relation $$X \geq N_1 = 174 \tag{4}$$

Numerals 1 to 518 shown in FIGS. 2A, 2G and 4 denote effective line numbers of video signals recorded on the tape 1. FIG. 2G shows video signals to be recorded, which are outputted by a time base conversion apparatus described later. As shown in FIG. 2G, the signal of each field is divided into three segment signals. A first segment signal contains video signals of 170 lines in total ranging from line number 1 to line number 170 and the vertical synchronizing information signal of four lines (i.e., signal of shaded regions of FIG. 2G) at the top portion thereof. A second segment signal contains video signals of 174 lines in total ranging from line number 171 to line number 344. A third segment signal contains video signals of 174 lines in total ranging from line number 345 to line number 518. Further, redundant intervals $\tau_S$ are generated between the first segment signal and the second segment signal and between the second segment signal and the third segment signal. Respective segment signals are recorded on the tape 1 so that the redundant interval $\tau_S$ may be located within the above described overlap (intervals $Q_1$ and $Q_2$ of FIG. 4), i.e., at both ends of tracks. Further, in the video signal within each of the above described segment signals, a redundant interval $\tau_H$ is generated between line signals as shown in FIG. 3B.

In accordance with the present invention, the input video signal is shifted on time base and the video signals to be recorded are generated so that the total sum $\tau_X$ of the redundant intervals heretofore described per field may not exceed the vertical blanking interval $\tau_B$ of the inputted video signals. In the above described embodiment of FIG. 1, the total sum $\tau_X$ of the redundant intervals is given by the relation $$\begin{aligned} \tau_X &= [\tau_S + \tau_H \times (N_1 - 1)] \times n \\ &= (\tau_S + \tau_H \times 173) \times 3 \end{aligned} \quad (5)$$

On the other hand, the horizontal scanning period $T_H$ of the input video signal becomes $T_H = 29.63$ µs in case of the above described high definition television system. Assuming that the number of effective lines field is 518 as described above, the remaining vertical blanking interval $\tau_B$ is given by $$\begin{aligned} \tau_B &= (562.5 - 518) \times T_H \\ &= 1.319 \text{ msec} \end{aligned} \quad (6)$$

On the basis of equations (5) and (6), in accordance with the present invention, values of the above described redundant intervals $\tau_S$ and $\tau_H$ are defined so as to satisfy the relation $$\tau_X \leq \tau_B \quad (7)$$

And an interval $\tau_{BX}$ is removed from the vertical blanking interval $\tau_B$, the vertical blanking interval $\tau_B$ being shortened. To be concrete, in the above described embodiment of FIG. 1, the redundant intervals $\tau_S$ and $\tau_H$ are defined as follows as an example.

Figure 3:
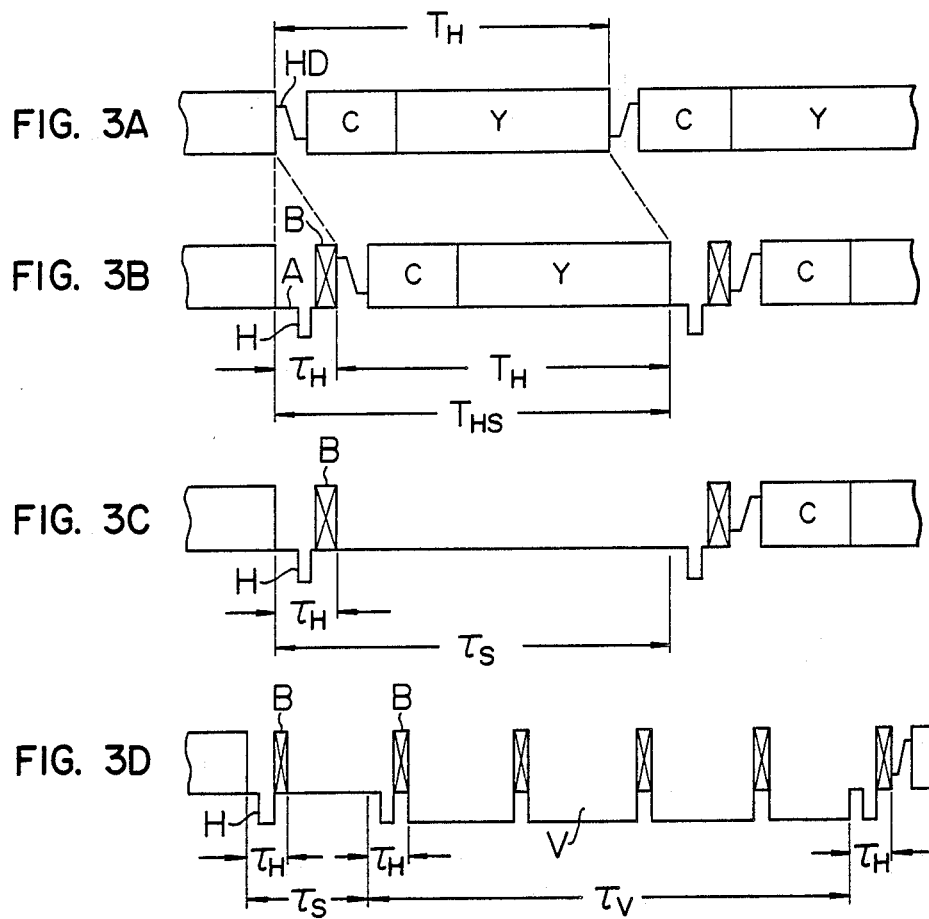
FIGS. 3A to 3D are waveform diagrams showing recorded video signals of the apparatus illustrated in FIG. 1.
Figure 4:
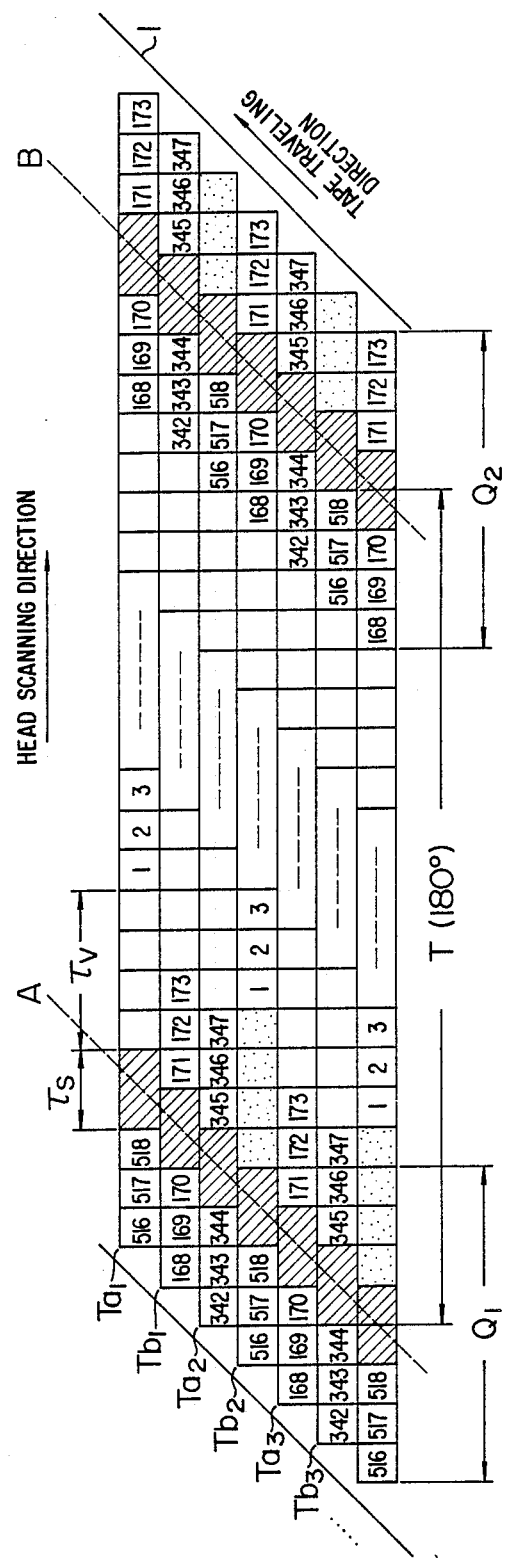
FIG. 4 is a tape pattern diagram of the apparatus illustrated in FIG. 1.

First of all, assuming now that a horizontal scanning interval of the video signal to be recorded including the above described redundant interval $\tau_H$ is $T_{HS}$ as shown in FIG. 3, the above described redundant interval $\tau_S$ is defined by the relation $$\tau_S = T_{HS} = \tau_H + T_H \quad (8)$$

By substituting the equation (8) into the equation (5) and defining $\tau_H$ so that the equality of the equation (7) may be satisfied, the following equation is obtained.

$$\tau_H = \frac{41.5}{174 \times 3} \times T_H = 2.36 \text{ µs} \quad (9)$$

By substituting the equation (9) into the equation (8), the following relation is obtained $$\tau_S = 31.99 \text{ µs} \quad (10)$$

By using the above described intervals $\tau_H$ and $\tau_S$, the redundant interval $\tau_S$ between segments is so chosen as to be equal to the horizontal scanning period $T_{HS}$ of the video signal to be recorded within a segment, and a video signal to be recorded having uniform periods over the entire duration is generated.

Succeedingly, the block 100a surrounded by broken lines in FIG. 1 represents a time base conversion apparatus for recording operation according to the present invention.

A write clock generation circuit 110 generates a write clock $CP_1$ in synchronism with the horizontal synchronizing information signal HS supplied from the above described synchronizing information output circuit 140. This write clock $CP_1$ is supplied to the write address control circuit 111 and an A–D conversion circuit 101. The write address control circuit 111 includes a counter and starts counting operation upon reception of the horizontal synchronizing information signal HS from the above described synchronizing information output circuit 140. The write address control circuit 111 counts the write clocks $CP_1$ supplied from the above described write clock generation circuit 110, generates an address signal corresponding to the counted value, and supplies this address signal to a memory 102 as a write address signal. This address signal is updated by the above described horizontal synchronizing information signal HS every horizontal scanning period. In synchronism with the write clock $CP_1$ outputted from the above described write clock generation circuit 110, therefore, the input video signal (FIG. 2A) supplied from the terminal 200 is converted into a digital signal by the A-D conversion circuit 101. In accordance with the address signal supplied from the above described write address control circuit 111, the digital signal is written into the memory 102 by taking each horizontal scanning period as unit.

In order to ensure the writing operation into the memory 102, the vertical synchronizing information signal VS fed from the synchronizing information output circuit 140 is supplied to the write address control circuit 111. The address signal is reset by the vertical synchronizing information signal VS every field period.

A read clock generation circuit 120 generates a read clock $CP_2$ in synchronism with the write clock $CP_1$ supplied from the above described write clock generation circuit 110. This read clock generation circuit 120 is illustrated in FIG. 5.

Figure 5:
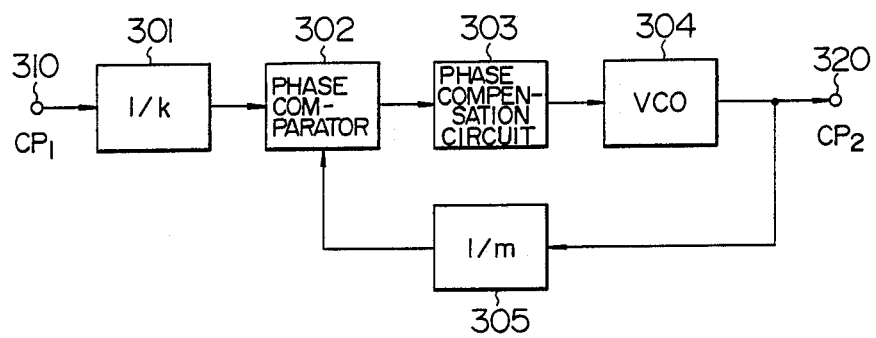
FIG. 5 is a block diagram showing an example of a readout clock generation circuit.

In FIG. 5, the write clock $CP_1$ is supplied from the above described write clock generation circuit 110 to an input terminal 310. The write clock $CP_1$ fed from the terminal 310 undergoes frequency division with a factor of 1/k (where k is an integer not less than unity) in a frequency division circuit 301. The frequency-divided output signal is supplied to one of input terminals of a phase comparator circuit 302. The output signal of a frequency division circuit 305 is supplied to the other of input terminals of the phase comparator circuit 302. The output signal of a voltage controlled oscillation circuit 304 undergoes frequency division with a factor of 1/m (where m is an integer not less than unity) in the frequency division circuit 305. In the phase comparator circuit 302, the phase of the output signal of the frequency division circuit 301 is compared with the phase of the output signal of the frequency division circuit 305. A phase error signal corresponding to the phase difference between them is outputted from the phase comparator circuit 302. The output signal of the phase comparator circuit 302 is supplied to the voltage controlled oscillation circuit 304 as the control voltage via a phase compensation circuit 303. The output of the voltage controlled oscillation circuit 304 is supplied to an output terminal 320 as the read clock $CP_2$. The circuits heretofore described constitute a PLL (phase-locked loop) circuit. The read clock $CP_2$ supplied from the above described voltage controlled oscillation circuit 304 is in phase synchronism with the write clock $CP_1$ supplied from the terminal 310. The frequency $f_2$ of the read clock $CP_2$ supplied from the read clock generation circuit 120 is related to the frequency $f_1$ of the write clock $CP_1$ supplied from the above described write clock generation circuit 110 by equation $$f_2 = \frac{m}{k} \times f_1. \tag{11}$$

The read clock $CP_2$ fed from the read clock generation circuit 120 is supplied to a read address control circuit 121 and a D-A conversion circuit 104.

A delay circuit 11 is triggered by both rising and falling edges of the output (FIG. 2C) of the above described pulse shaping circuit 8 to output a pulse (FIG. 2D) having a predetermined time width $\tau_2$, where the value of this interval $\tau_2$ is so defined as to be related to the value of the above described interval $\tau_S$ by equation $\tau_2 \approx \tau_S/2$. The output signal of the delay circuit 11 is supplied to a read start pulse generation circuit 122. In this read start pulse generation circuit 122, a pulse (FIG. 2E) is generated in synchronism with a falling edge of the output signal of the above described delay circuit 11. The output pulse of the read start pulse generation circuit 122 is synchronized to the tachometer pulse fed from the above described tac head 5, and hence synchronized to the rotation of the above described heads 4a and 4b, and is supplied to the read address control circuit 121 every scanning period of the heads 4a and 4b (represented by T in FIG. 2C) as a read start pulse RS for commanding the read address control circuit to start reading data recorded in the memory 102.

The read address control circuit 121 includes a counter and starts counting operation upon reception of the read start pulse RS from the above described address control circuit 122. The read address control circuit 121 counts the read clocks $CP_2$ supplied from the above described read clock generation circuit 120, generates an address signal corresponding to the counted value, and supplies this address signal to the memory 102 as a read address signal of the memory 102.

Figure 6:
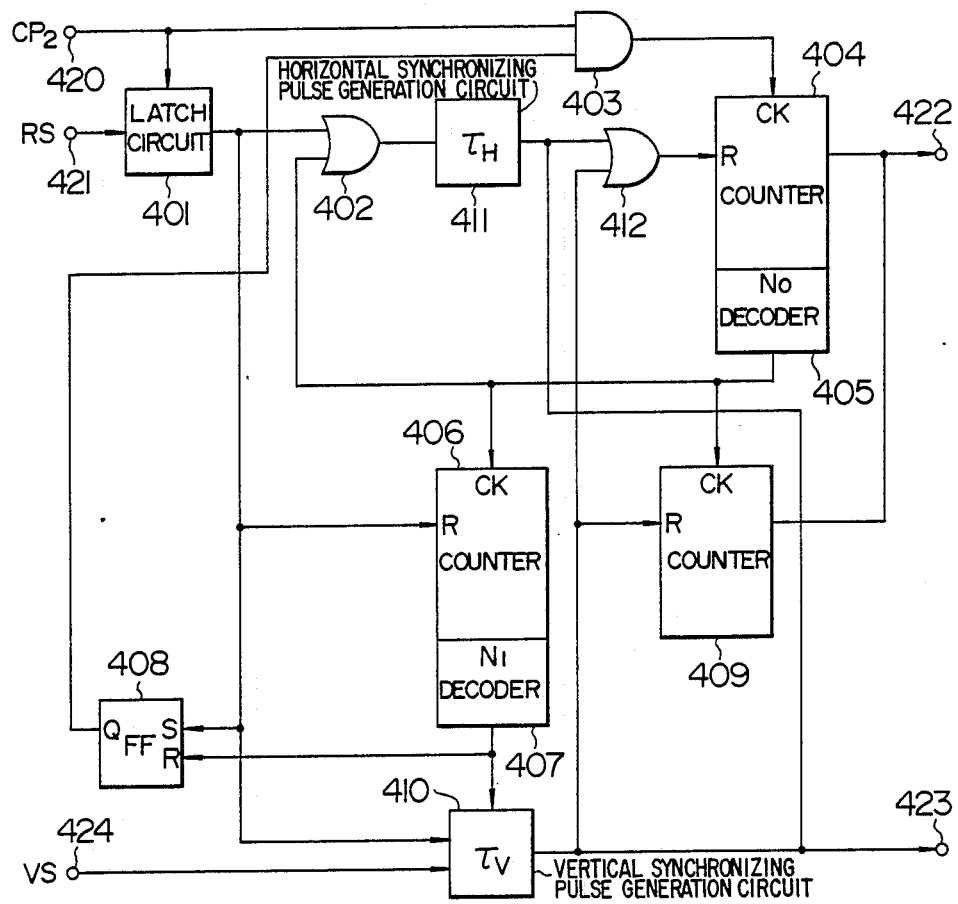
FIG. 6 is a block diagram showing an example of a readout address control circuit.

This read address control circuit 121 is illustrated in FIG. 6.

In FIG. 6, the read clock $CP_2$ is supplied from the above described read clock generation circuit 120 to an input terminal 420, and the read start pulse RS is supplied from the above described read start pulse generation circuit 122 to an input terminal 421. The read start pulse RS fed from the input terminal 421 is synchronized to the read clock $CP_2$ fed from the input terminal 420 in a latch circuit 401. The output signal of the latch circuit 401 is supplied to a horizontal synchronization pulse generation circuit 411 via an OR gate 402. In the horizontal synchronizing pulse generation circuit 411, a pulse f (FIG. 2F) having a pulse width $\tau_H$ is generated. This pulse f is supplied to a reset input terminal R of a counter 404 via an OR gate 412. The counter 404 is reset by the pulse f in the interval $\tau_H$. Further, the read clock $CP_2$ fed from the terminal 420 is supplied to a clock input terminal CK of the counter 404 via an AND gate 403. An R/S flip-flop circuit 408 is set by the output signal of the above described circuit 401, the level of its output terminal Q (FIG. 2I) being changed to its high level "H". Thereby the AND gate 403 is opened, and hence the clock $CP_2$ is supplied from the input terminal 420 to the counter 404. The counter 404 thus starts counting operation. A decoder 405 decodes the count of the counter 404, and outputs a pulse when the count in the above described counter 404 has reached No. In this embodiment, the value of No is so set as to be equal to the number of clocks of the above described clock $CP_1$ included in one horizontal scanning interval of the video signal (FIG. 2A). The output pulse of the decoder 405 is supplied to the above described horizontal synchronizing pulse generation circuit 411 via the OR gate 402. The pulse f having the pulse width $\tau_H$ is thus generated again and supplied to the reset input terminal R of the counter 404 via the OR gate 412. As a result, the counter 404 is reset again in the interval $\tau_H$, and thereafter counting operation is restarted. The operation heretofore described is repeated on the basis of the output pulse of the decoder 405. The count output signal is supplied from the counter 404 to the above described memory 102 via a terminal 422 as the read address signal. The above described count value No is so set as to be equal to the number of write clocks included in one horizontal scanning interval of the video signal. Therefore, all of the video signals written into the above described memory 102 are successively read out in that horizontal scanning interval.

The output signal of the above described decoder 405 is inputted to clock input terminals CK of counters 406 and 409. Further, the output signal of the above described latch circuit 401 is supplied to a reset input terminal R of the counter 406 to reset the counter 406. The counter 406 thus begins to count output pulses of the decoder 405. A decoder 407 decodes the counted value of the counter 406, and outputs a pulse when the count of the counter 406 has reached the value $N_1$. In this embodiment, the value $N_1$ is so set as to satisfy the relation $N_1 = 174$.

The above described flip-flop circuit 408 is reset by the output signal of the decoder 407, and hence the level of an output terminal Q of the flip-flop circuit 408 (FIG. 2I) becomes a low level "L". As a result, the AND gate 403 is closed. Therefore, counting operation in the above described counters 404, 406 and 409 is temporarily stopped.

The operation heretofore described is repetitively performed with the period T of the read start pulse RS supplied to the terminal 421.

On the basis of the vertical synchronizing information signal VS supplied from the above described synchronizing information output circuit 140 via a terminal 424, a vertical synchronizing pulse generation circuit 410 selects and separates a field start pulse indicating the start of each field (P$_1$ and P$_2$ shown in FIG. 2E) out of the output pulse of the above described latch circuit 401, counts output pulses of the above described decoder 407 from the time of the field start pulse by a predetermined number (4 in this embodiment), and generates a vertical synchronizing pulse having a pulse width $\tau_V$ (FIG. 2H). The pulse fed from the vertical synchronizing pulse generation circuit 410 is supplied to the reset input terminal R of the counter 404 via the OR gate 412. In addition, the pulse fed from the vertical synchronizing pulse generation circuit 410 is supplied to a reset input terminal R of the counter 409 as well. The counter 409 is reset during the interval $\tau_V$, and thereafter begins to count the output pulses of the above described decoder 405. The counted value of the counter 409 is supplied to the above described memory 102 via the terminal 422 as the read address signal for horizontal scanning.

The horizontal synchronizing pulse fed from the above described horizontal synchronizing pulse generation circuit 411 and the vertical synchronizing pulse fed from the above described vertical synchronizing pulse generation circuit 410 are supplied to a synchronizing information generation circuit 130.

As a result of the operation heretofore described, the above described counter 404 is reset in the interval $\tau_H$ of a horizontal synchronizing pulse outputted from the above described horizontal synchronizing pulse generation circuit 411, and the address of the above described memory is not updated. Readout of video signals from the above described memory 102 is not performed. In the same way, in an interval $\tau_V$ of the vertical synchronizing pulse outputted from the above described vertical synchronizing pulse generation circuit 410, the counters 404 and 409 are reset, and the address of the memory 102 is not updated, and hence readout of video signals from the above described memory 102 is not performed. Further, in an interval in which the level of the output signal of the above described flip-flop circuit 408 is a low level "L" (i.e., in the interval $\tau_S$ of FIG. 2G), the gate 403 is closed, and the address updating is not performed in the above described counters 404 and 409, and hence readout of video signals from the above described memory is not performed either.

On the other hand, the above described synchronizing information generation circuit 130 generates a vertical synchronizing information signal containing a vertical synchronizing signal V of negative polarity and a burst signal B as shown in FIG. 3D in the above described interval $\tau_V$ of the vertical synchronizing pulse, and generates a horizontal synchronizing information signal containing a horizontal synchronizing signal H of negative polarity and a burst signal B as shown in FIG. 3B in the above described interval $\tau_H$ of the horizontal synchronizing pulse. The vertical synchronizing information signal and the horizontal synchronizing information signal are supplied to a synchronizing information insertion circuit 103 and added to a video signal read out from the above described memory 102. The resultant composite video signal is converted into an analog signal by the D-A conversion circuit 104 and then supplied to an output terminal 300.

On the basis of the read address signal outputted from the output terminal 422, therefore, data are successively read out from the memory 102, and supplemented with above described synchronizing information in the above described information insertion circuit 103. The video signal outputted from the above described D-A conversion circuit 104 has a structure form as shown in FIG. 2G. That is to say, in the first head scanning interval T$_1$ of each field (i.e., in the first segment interval shown in FIG. 2G), the vertical synchronizing information signal corresponding to 4 lines (i.e., a shaded region of FIG. 2G) is outputted at the top portion of the segment signal. Succeedingly thereafter, video signals of line number 1 to line number 170 are shifted on time base line by line and outputted from the memory 102.

Redundant intervals $\tau_H$ (FIG. 3B) are generated between respective line signals. In the redundant interval $\tau_H$, the above described horizontal synchronizing information signal H is added. In the next head scanning interval T$_2$ (i.e., in the second segment signal interval shown in FIG. 2G), video signals of line number 171 to line number 344 are shifted on time base line signal by line signal and outputted from the memory 102. In the succeeding head scanning interval T$_3$ (i.e., in the third segment interval shown in FIG. 2G), video signals of line number 345 to line number 518 are similarly shifted on time base line signal by line signal and outputted from the memory 102. In each of these segment intervals as well, the redundant interval $\tau_H$ is generated between line signals. Into the redundant interval $\tau_H$, the above described horizontal synchronizing information signal H is inserted. Further, a redundant interval $\tau_S$ is generated between segment signals. In the redundant interval $\tau_S$, the above described horizontal synchronizing information signal H is inserted into the interval $\tau_H$ at the top portion thereof as shown in FIG. 3C, whereas arbitrary signals such as constant signals of black level are inserted into the remaining interval.

In the embodiment of the read clock generation circuit 120 according to the present invention shown in FIG. 5, frequency division values k and m of the frequency division circuits 301 and 305 can be arbitrarily defined. Especially when k=m, i.e., the frequency f$_1$ of the write clock CP$_1$ is equal to the frequency f$_2$ of the read clock CP$_2$, the above described read clock generation circuit 120 is not especially needed, but the write clock CP$_1$ is directly supplied from the above described write clock generation circuit 110 to the above described read address control circuit 121 and D/A converter 104. In this case, the input video signal is shifted on time base by the above described time base conversion apparatus 100a while taking a line as unit. And compression or expansion of the input video signal on time base is not performed. The occupied frequency bandwidth of the video signal to be recorded, which is shifted on time base per line is equivalent to that of the original input video signal. In this case, it is possible to obtain the redundant interval $\tau_H$ having the value indicated before by equation (9) as an example.

If, on the other hand, k>m, it follows from the equation (11) that f$_2$<f$_1$. In this case, therefore, the time base expansion and the time base shift of a line signal are performed en bloc. Accordingly, the redundant interval $\tau_H$ for containing the horizontal synchronizing information signal becomes smaller than the value of the equation (9). However, the occupied frequency bandwidth of the video signal to be recorded per line also becomes smaller.

If, on the contrary, k<m, it follows that f$_2$>f$_1$, and the time base compression and time base shift of the input video signal are performed en bloc while taking a line as unit. In this case, therefore, the occupied frequency bandwidth of the video signal to be recorded per line is somewhat increased. And the redundant interval $\tau_H$, $\tau_V$ or $\tau_S$ is also increased.

Concrete waveforms of recorded video signals generated by the time base conversion apparatus 100a heretofore described are shown in FIGS. 3A to 3D. FIG. 3A shows an input video signal, and concretely a video signal having a horizontal synchronizing signal HD of positive polarity such as a video signal of the MUSE system described before. In FIG. 3A, the signal Y is a luminance signal, and the signal C is a color signal. The interval $T_H$ is one horizontal scanning period.

Each of FIGS. 3B to 3D shows a recorded video signal outputted from the above described time base conversion apparatus 100a. FIG. 3B shows the signal waveform of line unit located near the above described redundant interval $\tau_H$. FIG. 3C shows the signal waveform located near a redundant interval $\tau_S$ between the above described first segment signal and the second segment signal or between the second segment signal and the third segment signal. FIG. 3D shows the signal waveform located near a redundant interval $\tau_V$. In FIGS. 3B to 3D, the signal H is a horizontal synchronizing signal of negative polarity, and the signal B is a burst signal repeated over several cycles with a frequency belonging to the video signal band, whereas the signal V is a vertical synchronizing signal of negative polarity. These synchronizing information signals are generated by the synchronizing information generation circuit 130 as described before.

In this way, the video signal to be recorded, which is outputted from the above described time base conversion apparatus 100a, is supplied to a processing circuit 30a for video signal to be recorded via the output terminal 300. In the processing circuit 30a, the video signal undergo appropriate recording processing such as FM modulation. The video signal thus processed is then supplied to the heads 4a and 4b and recorded on the tape 1.

The pattern diagram of tracks formed on the tape 1 is shown in FIG. 4.

In FIG. 4, tracks $T_{a1}$, $T_{a2}$, $T_{a3}$, --- are formed by scanning of the above described head 4a, whereas tracks $T_{b1}$, $T_{b2}$, $T_{b3}$, --- are formed by scanning of the above described head 4b. Broken lines A and B of FIG. 4 respectively indicate positions on the tape 1 corresponding to phases of the rising edge and the falling edge of the head changeover signal (FIG. 2C) outputted from the above described pulse shaping circuit 8. Further, an interval $\tau_S$ represented by a shaded region corresponds to the above described redundant interval $\tau_S$. Affixed numerals (1 to 518) of each track indicate the above described line numbers of the video signals to be recorded.

In the present invention, the above described redundant interval $\tau_S$ is provided by the above described time base conversion apparatus 100a shown in FIG. 1. It is thus possible to completely remove skew distortion of video signals caused when video signals recorded in a segment form as described before are reproduced.

Figure 7:
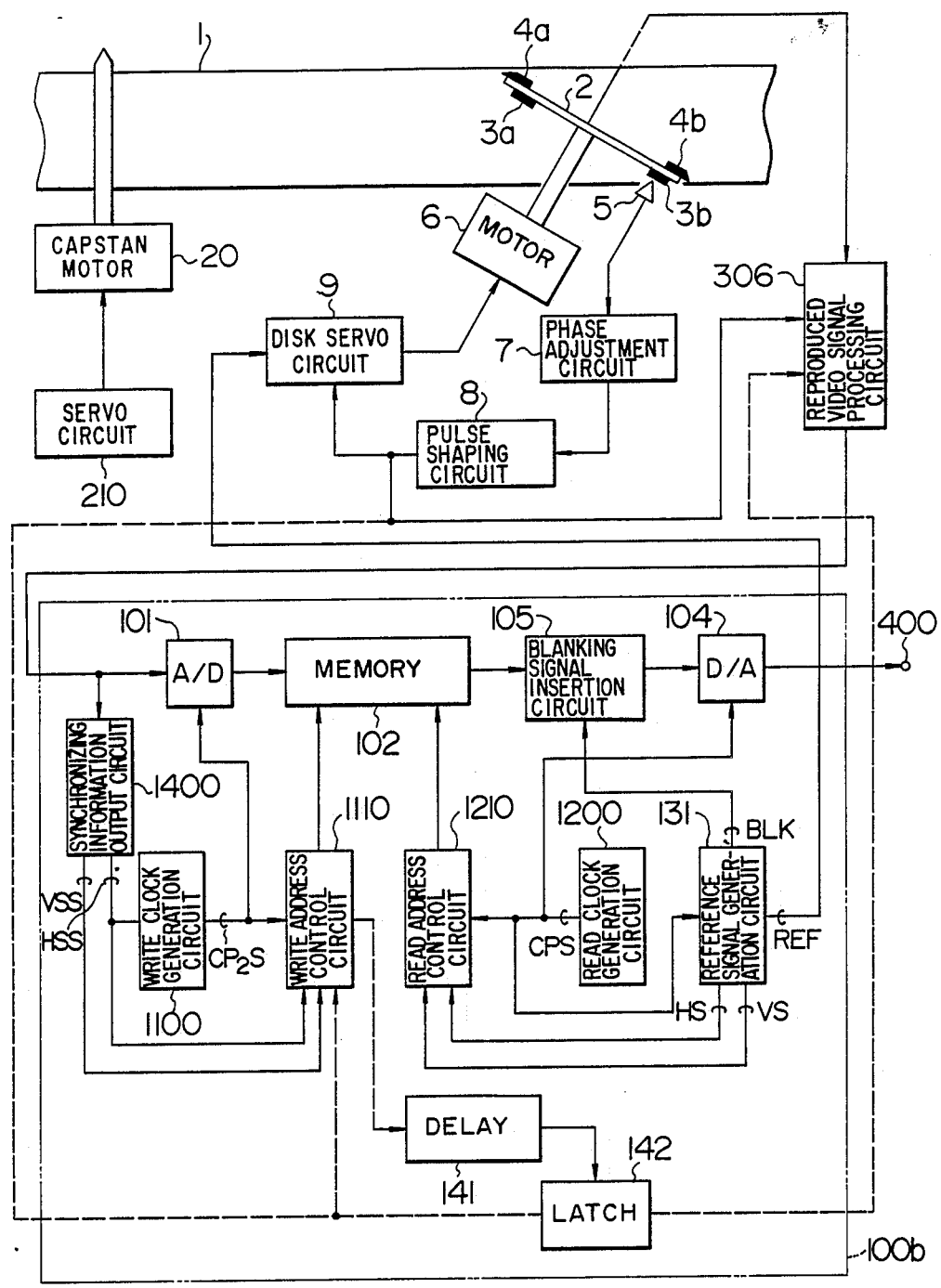
FIG. 7 is a block diagram showing an embodiment of a video signal reproducing apparatus according to the present invention.

An embodiment of a reproducing apparatus for reproducing video signals recorded on the magnetic tape 1 and reconstructing the original video signals is shown in FIG. 7. Waveform diagrams of respective portions of the reproducing apparatus used for explaining the operation thereof are shown in FIGS. 8A to 8K.

A part of the reproducing apparatus shown in FIG. 7 can be used in common with a part of the above described recording apparatus shown in FIG. 1. Therefore, common components are denoted by identical numerals. Since the operation of the common part is the same as that of the apparatus shown in FIG. 1, its description is omitted.

Video signals reproduced from the tape 1 alternately by the heads 4a and 4b undergo reproduction processing in a reproduced video signal processing circuit 30b. Thereafter, the output signal (FIG. 8A) of the circuit 30b is supplied to a time base conversion apparatus 100b. In a synchronizing information output circuit 1400, a vertical synchronizing information signal VSS (FIG. 8C) and a horizontal synchronizing information signal HSS (FIG. 8D) are separated from the reproduced video signal supplied from the above described reproduced video signal processing circuit 30b and outputted. In a write clock generation circuit 1100, a write clock $CP_2S$ synchronized to the horizontal synchronizing information signal HSS supplied from the above described synchronizing information output circuit 1400 is generated and outputted.

This write clock $CP_2S$ is obtained from an apparatus for generating consecutive clocks at least over one horizontal scanning interval in instantaneous phase synchronism with the above described horizontal synchronizing information signal HSS such as a horizontal synchronizing signal or a burst signal contained in the reproduced video signal. This write clock $CP_2S$ is so generated as to have the same frequency ($f_2$) as that of the above described read clock shown in FIG. 1. On the basis of the write clock $CP_2S$ supplied from the write clock generation circuit 1100, the reproduced video signal supplied from the above described reproduced video signal processing circuit 30b is converted into a digital signal by an A D conversion circuit 101. A write address control circuit 1110 includes a counter. On the basis of the horizontal synchronizing information signal HSS supplied from the above described synchronizing information circuit 1400, the write address control circuit 1110 starts its counting operation in an interval included in a horizontal scanning interval $T_{HP}$ of the reproduced video signal with the exception of the above described redundant interval $\tau_H$. The write address control circuit 1110 thus counts the write clocks $CP_2S$ supplied from the above described 1100, and supplies a signal corresponding to the counted value to the memory 102 as a write address signal. This address signal is updated by the above described horizontal synchronizing information signal HSS while taking a horizontal scanning period as unit. Therefore, only effective portions of the output signal of the above described A-D conversion circuit with the exception of the above described redundant interval $\tau_H$ are successively and cyclically written into the memory 102.

As described before with reference to FIG. 1, the video signal is so recorded that the above described redundant interval $\tau_S$ may be positioned at transition between the scanning of the head 4a and the scanning of the head 4b, i.e., at phases of the rising edge and the falling edge of the head changeover signal (FIG. 8B) supplied from the above described pulse shaping circuit 8, i.e., at positions represented by the broken lines A and B of FIG. 4. Accordingly, phases of the head changeover signal coincide with positions of the redundant interval $\tau_S$. By alternately selecting the video signal reproduced by the head 4a and the video signal reproduced by the head 4b in the reproduced video signal processing circuit 30b on the basis of the head changeover signal supplied from the pulse shaping circuit 8, therefore, all of the video signals contained within a scanning interval T of the heads 4a and 4b are surely reproduced. That is to say, reproduction of video signals of line numbers 1, 2, 3, ---, 170 follows reproduction of the vertical synchronizing information signal (represented by a shaded region of FIG. 8A) in a first scanning interval $T_1$ of the head 4a (i.e., a first segment signal interval). In a scanning interval $T_2$ of the next head 4b (i.e., a second segment signal interval), video signals of line numbers 171, 172, ---, 344 are reproduced. In a scanning interval $T_3$ of the next head 4a (i.e., a third segment signal interval), video signals of line numbers 345, 346, ---, 518 are reproduced. The operation heretofore described is repeatedly performed with a period of field. As a result, one consecutive video signal (FIG. 8A) is outputted from the above described reproduced video signal processing circuit 30b.

On the other hand, the horizontal synchronizing information signals HSS (FIG. 8D) supplied from the synchronizing information output circuit 1400 are counted up to a predetermined number in the above described write address control circuit 1110 every scanning period T of the heads 4a and 4b. To be concrete, the horizontal synchronizing information signals HSS of 170 lines with the exception of vertical synchronizing information signals of 4 lines are counted in the above described first segment signal interval $T_1$. In each of the second segment signal interval $T_2$ and the third segment signal interval $T_3$, the horizontal synchronizing information signals HSS of 174 lines are counted. In an interval within each of the first, second and third segment signals beginning after the completion of counting the horizontal synchronizing information signals HSS and ending upon input of the next horizontal synchronizing information signal HSS, i.e., in an interval corresponding to the above described redundant interval $\tau_S$, output of the above described write address signal is temporarily stopped.

In the interval $\tau_V$ of 4 lines of the above described vertical synchronizing information signal VSS and the above described interval $\tau_S$, signals are not written into the memory 102. Further, in these intervals $\tau_V$ and $\tau_S$, blank portions having no signals written thereon are not generated in the memory 102. All of the video signals of line numbers 1 to 518 outputted from the A-D conversion circuit 101 are written into the memory 102 without causing the above described redundant interval $\tau_H$.

As indicated by a path of a broken line in FIG. 7, the above described write address generation circuit 1110 is supplied with the head changeover signal from the above described pulse shaping circuit 8. Whenever the head changeover signal rises and falls, the write address generation circuit 1110 begins to count the above described horizontal synchronizing information signals HSS and counts the horizontal synchronizing information signals HSS inputted there after by a predetermined number. The vertical synchronizing information signal VSS (FIG. 8C) supplied from the above described synchronizing information output circuit 1400 may be used instead of the head changeover signal. In this case, the horizontal synchronizing information signals HSS begin to be counted upon the arrival of the vertical synchronizing information signal VSS, and thereafter the horizontal synchronizing information signals HSS are successively and repeatedly counted by a predetermined number each time.

Figure 8:
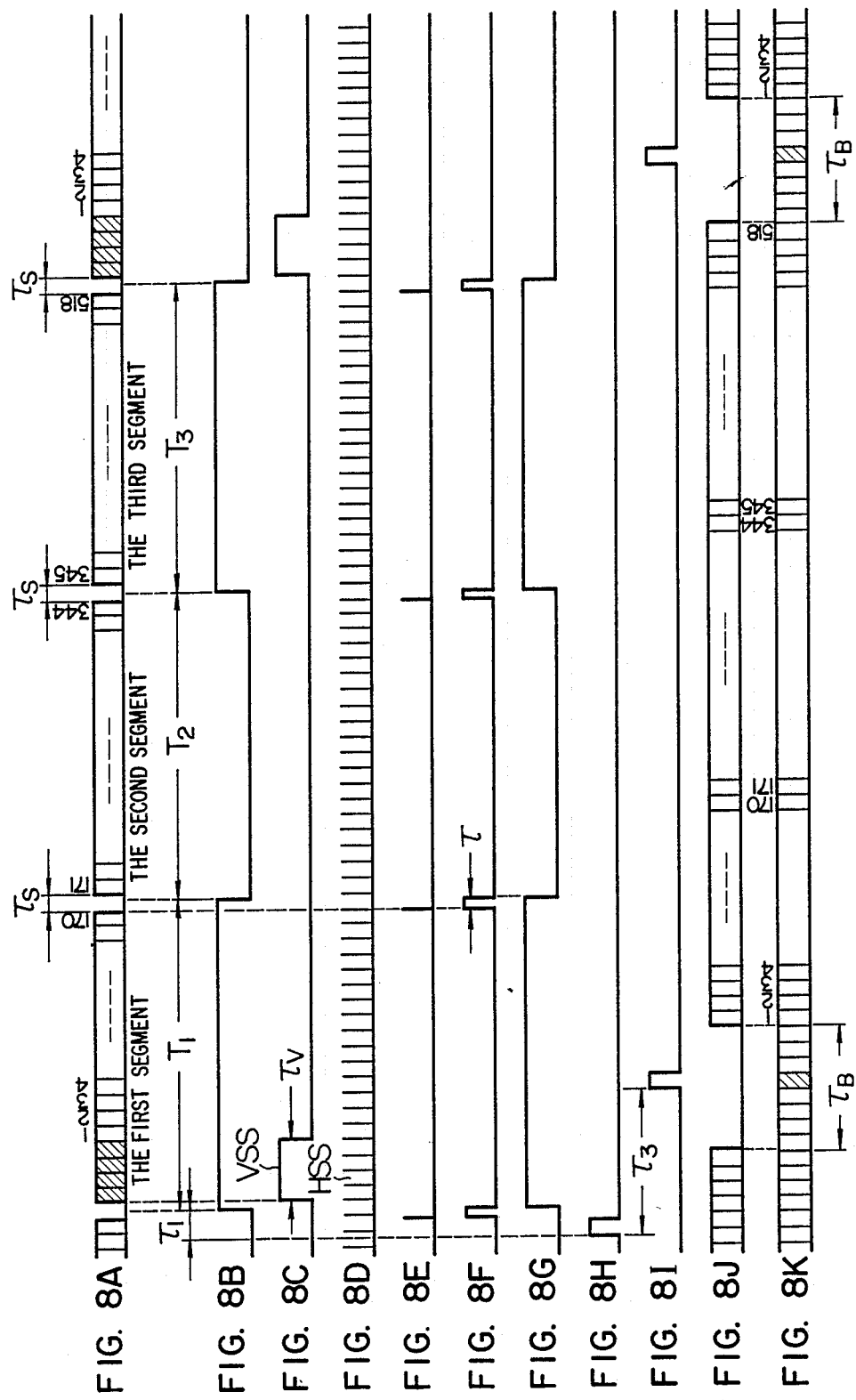
FIGS. 8A to 8K are waveform diagrams of respective portions of the apparatus illustrated in FIG. 7.

When the latter counting method is used, the position of the above described redundant interval $\tau_S$ is self-detected on the basis of the above described vertical synchronizing information signal VSS without using the above described head changeover signal. Further, in accordance with this counting method, the horizontal synchronizing information signals HSS are counted by a predetermined number, and a counting end pulse (FIG. 8E) obtained when the counting is finished is outputted from the above described write address generation circuit 1110. This counting end pulse is delayed in a delay circuit 141 by a predetermined time $\tau(\approx \tau_S/2)$ (FIG. 8F). In a latch circuit 142, the head changeover signal fed from the above described pulse shaping circuit 8 is synchronized to the falling edge of the output signal (FIG. 8F) of the above described delay circuit 141. The latch circuit 142 thus outputs a signal having phases of the rising edge and the falling edge contained in the above described redundant interval $\tau_S$ as shown in FIG. 8G. The output signal of the latch circuit 142 may be supplied to the above described reproduced video signal processing circuit 306 as shown by a path of broken line of FIG. 7 instead of the head changeover signal fed from the pulse shaping circuit 8 so as to alternately select outputs of the heads 4a and 4b by using the output signal of the latch circuit 142. In this case as well, video signals are continuously reproduced without causing excess and shortage of lines.

In a read clock generation circuit 1200, a read clock $CP_1S$ having the same frequency ($f_1$) as that of the above described write clock $CP_1$ shown in FIG. 1 is generated. Clocks supplied from the above described read clock generation circuit 1200 undergo frequency division in a reference signal generation circuit 131. A blanking signal BLK (which includes a synchronizing information signal as well), a horizontal synchronizing pulse HS, and a vertical synchronizing pulse VS (FIG. 8I) having the same format and frequency as those of the original video signal (FIG. 2A) are thus generated in the reference signal generation circuit 131. Further, a reference signal REF (FIG. 8H) preceding the vertical synchronizing pulse VS by a predetermined time $\tau_3$ is also generated in the reference signal generation circuit 131. A read address control circuit 1210 includes a counter. Upon the arrival of the horizontal synchronizing pulse HS fed from the above described reference signal generation circuit 131, the read address generation circuit 1210 starts its counting operation and counts the read clocks $CP_1S$ fed from the read clock generation circuit 1200. An address signal corresponding to the counted value is outputted from the read address generation circuit 1210 and supplied to the above described memory 102. This address signal is updated by the above described horizontal synchronizing pulse HS every horizontal scanning period. When the count of the horizontal synchronizing pulses has reached a predetermined number (518 in the present embodiment), output of the above described read address signal is temporarily stopped. Upon the arrival of the vertical synchronizing pulse VS from the above described reference signal generation circuit, the above described sequence of counting operation is restarted and the above described operation is repeated.

As shown in FIG. 8J, therefore, video signals read out and outputted from the memory 102 in accordance with the read address signals fed from the above described read address generation circuit 1210 includes all of consecutive signals ranging from line number 1 to line number 518 per field. The video signals contain neither the redundant interval $\tau_H$, nor the redundant interval $\tau_S$, nor the redundant interval $\tau_V$.

In a blanking signal insertion circuit 105, the blanking signal BLK fed from the above described reference signal generation circuit 131 is inserted into the output signal (FIG. 8J) of the memory 102. The output signal of the blanking signal insertion circuit 105 is converted into an analog signal by a D-A conversion circuit 104 and supplied to an output terminal 400.

The reference signal REF is supplied from the above described reference signal generation circuit 131 to the disk servo circuit 9 as a servo reference signal in reproduction operation. Control similar to the servo control described before with reference to FIG. 1 is performed by the disk servo circuit 9. The rotation of the disk motor 6 is so controlled that the above described reference signal REF may be synchronized in phase to the head changeover signal supplied from the above described circuit 8, and more concretely, the phase difference between the reference signal REF (FIG. 8H) and the head changeover signal (FIG. 8B) may become the time $\tau_1$ as shown in FIG. 8B.

The rotation of the capstan motor 20 is controlled by a capstan servo circuit 210. This capstan servo circuit 210 includes a tracking control circuit for controlling the relative phases of the heads 4a and 4b with respect to the tape 1 and thereby reproducing signals correctly.

As a result of control performed by the servo control system heretofore described, the write operation with respect to the memory 102 precedes in time the read operation. Therefore, all of the video signals written into the memory 102 are correctly read out on stable time base free from fluctuation without causing omission. Further, the vertical blanking signal and the vertical synchronizing information signal (i.e., signals appearing in the interval $\tau_B$ of FIG. 8K) removed in the recording operation as described before are complemented by the above described blanking signal BLK in the above described blanking signal insertion circuit 105.

Therefore, stable video signals cleared of skew distortion and time base fluctuation included in the reproduced video signal (FIG. 8A) and reconstructed from the original video signals with fidelity are outputted from the output terminal 400.

In accordance with the present invention, the amount of skew distortion which can be corrected is equivalent to the above described redundant interval $\tau_S$, and its value is given by the aforementioned equation (10). Skew is thus corrected sufficiently.

Further, since the above described redundant interval $\tau_S$ is generated in synchronism with the rotation of the heads, signals are so recorded that the above described redundant interval $\tau_S$ may be located at a predetermined position on the tape as shown in FIG. 4. And the position is not fluctuated.

In the above described embodiment shown in FIG. 1, video signal recording is started at timing synchronized to the rotation phase of heads at intervals of segment signal period T. However, the present invention is not limited to this. Instead, video signal recording may be started by taking a plurality of segment blocks as unit. For example, in the embodiment shown in FIGS. 2A to 2I, video signal recording may be started at intervals of period 3T of the three segment signals comprising the first, second and third segment signals (i.e., at intervals of the field period) and at timing of pulses $P_1$, $P_2$, --- synchronized to the rotation phase of heads.

In accordance with the present invention, the above described time base shift performed by taking segment signal as unit is not indispensable. It is a feature of the present invention that the above described redundant interval $\tau_S$ is provided by the time base shift of segment signals, and the head switching between segment signals and signal joint processing (correction of skew distortion) in reproduction operation are performed in the redundant interval $\tau_S$. The head changeover between segment signals and signal joint processing in reproduction operation may be performed in the redundant interval $\tau_H$ formed by the time base shift obtained by taking a line block as unit instead of the time base shift by taking a segment block as unit. To be concrete, they may be performed in a front porch portion A of the horizontal synchronizing signal H included in the redundant interval $\tau_H$ shown in FIG. 3B, for example. In this case, the correction margin of skew distortion is decreased as compared with the above described case where skew distortion is corrected in the above described redundant interval $\tau_S$. In this case as well, however, stable signal reproduction is performed.

Further, since the above described signal reproduction processing and time base conversion processing of reproduction are performed on the basis of synchronizing information signals inserted into video signals beforehand in recording operation, i.e., synchronizing information signals suited to the characteristics of the reproduction circuit such as the horizontal synchronizing signal H of negative polarity, the burst signal B and the vertical synchronizing signal V shown in FIGS. 3A to 3D, sure and stable signal processing with high precision and high reliability is performed.

Further, since the synchronizing information signals are inserted into the original video signals by using the time of a redundant portion (vertical blanking) included in the video signals, the characteristics originally possessed by the original video signals are not deteriorated at all, signal recording and reproduction with high fidelity being thus attained.

In the embodiments heretofore described, video signals are divided into 3 segments (n=3) and then recorded. However, the present invention is not limited to this. In general, the number n of segments may be arbitrarily chosen so long as n is an integer not less than unity. FIG. 9 shows a waveform of video signals to be recorded which is obtained from the time base conversion apparatus 100a of FIG. 1 when n is so chosen as to be n=2 and the present invention is applied to recording of video signals divided into two segments. In this embodiment of FIG. 9, a redundant interval $\tau_H$ is generated between signals of respective lines in each segment signal, and a redundant interval $\tau_S$ generated between respective segment signals in the same way as the foregoing description. Further in this embodiment, synchronizing information signals of, say, 2 lines (i.e., signals in an interval of a shaded region $\tau_V$ of FIG. 9) are recorded at the top of each segment signal, and video signals of 259 lines are further recorded. Synchronizing information signals shown in FIGS. 3A to 3D such as the horizontal synchronizing signal H, the burst signal B and the vertical synchronizing signal V are generated and recorded in these redundant intervals $\tau_H$, $\tau_S$ and $\tau_V$.

Further, in the embodiments heretofore described, the whole of the interval $T_H$ of the video signal of one line included in the inputted original video signal is regarded as an effective interval ss shown in FIGS. 3A to 3D, and the time base of the video signal of one line is shifted by taking the interval $T_H$ as unit to generate the redundant interval $\tau_H$. However, the present invention is not limited to this. In an alternative scheme, a line block signal comprises one or a plurality of effective horizontal scanning line units, and the line block signal is shifted on time so that a redundant interval $\tau_H$ may be generated between line block signals. Waveforms of recorded video signals based upon another embodiment of the present invention in accordance with this scheme are shown in FIGS. 10 and 11. FIG. 10 shows a case where the above described line block signal comprises only an effective interval $T_A$ included in the interval $T_H$ of one line of inputted original video signals shown in FIG. 11A, and a redundant interval $\tau_H$ is generated and added to the effective interval $T_A$ to form video signals to be recorded (FIG. 11B) having a period $T_{HP}$ ($=\tau_H+T_A$). In FIG. 10A, a so-called composite signal including a burst signal u of a carrier chrominance signal of the NTSC system or the PAL system and a video signal S comprising a luminance signal and a carrier chrominance signal frequency-multiplexed is shown as a concrete example of the inputted original video signal. And the above described effective interval $T_A$ includes these signals u and S. Further, signals inserted into the redundant interval $\tau_H$ are a horizontal synchronizing signal $H_2$ of negative polarity and a burst signal B. This horizontal synchronizing signal $H_2$ of negative polarity may be the same signal as a horizontal synchronizing signal $H_1$ of the inputted original video signals.

By using the embodiment shown in FIGS. 10A and 10B, it is possible to record and reproduce video signals with high fidelity without deforming the burst signal u of the carrier chrominance signal, and effects such as stabilized color reproduction of the reproduced video signals can be obtained.

In an embodiment shown in FIGS. 11A and 11B, signals of one block include signals belonging to an effective interval of a plurality of lines of an inputted original video signal shown in FIG. 11A, such as, in this example, signals belonging to an effective interval $2\times T_H$ corresponding to two lines. Further, a redundant interval $\tau_H$ is added to the effective interval $2T_H$ to form a video signals to be recorded (FIG. 11B) having a period $T_{HQ}$ ($=\tau_H+2T_H$). In the embodiment shown in FIGS. 11A and 11B, it is possible to obtain a longer redundant interval $\tau_H$, $\tau_S$ or $\tau_V$ as compared with the above described embodiment of FIGS. 3A to 3D in which the line block signal comprises only the video signal of one line.

When in general video signals are divided into n segment signals and then recorded, it is possible to align recorded video signals of adjacent tracks in a direction perpendicular to tracks at intervals of the horizontal scanning period by using the present invention. An embodiment in this case is shown in FIG. 12.

When in general video signals are divided into n segment signals and recorded as shown in FIG. 12, the scanning interval T of a head over 180° is given by $$T = L \times T_{HR} + \beta_H \quad (12)$$

where $T_{HR}$ is one horizontal scanning interval of the recorded video signals, $\alpha_H$ the amount of alignment displacement between adjacent tracks at ends of respective tracks, L the number of lines which can be recorded in the scanning interval T of the head over 180°, and $\beta_H$ the interval remained when signals of L lines have been recorded in that interval L. In accordance with the presention, the above described redundant interval $\tau_S$ is so defined by using the above described $\alpha_H$ and $\beta_H$ as to satisfy the relations $$\left.\begin{array}{l} \tau_S = \alpha_H + \beta_H + T_{HR} \times k \\ \tau_H = T_{HR}/l \\ \beta_H = \alpha_H \times m \end{array}\right\} \quad (13)$$

where all of k, l and m are integers.

In the above described embodiment shown in FIG. 12, k, l and m of the equation (13) are so defined as to satisfy the relations k=0, l=4 and m=2, and the above described redundant interval $\tau_S$ (represented by shaded regions of FIG. 12) is so defined as to satisfy the relation $\tau_S = \alpha_H + \beta_H = 3 \times \alpha_H$. As evident from FIG. 12, video signals of adjacent tracks are aligned, and hence disturbance such as crosstalk from adjacent tracks is reduced.

Owing to the present invention heretofore described, it becomes possible to record and reproduce signals with high fidelity even for special video signals having horizontal synchronizing signals of positive polarity or even for video signals of the NTSC system or PAL system having specific signals such as burst signals forming the reference of carrier chrominance signals, without deteriorating the characteristics possessed by original video signals to be recorded and without widening the occupied frequency bandwidth.

We claim:

1. A video signal recording method for a magnetic recording and reproducing apparatus for recording and reproducing video signals including a plurality of horizontal scanning line signals, each of said horizontal scanning line signals having a video information signal, at least one synchronizing signal, and a vertical blanking signal having a first predetermined interval, said vertical blanking signal appearing at a vertical scanning period, said video signals being recorded onto and reproduced from parallel oblique tracks on a magnetic tape by utilizing a plurality of rotary heads, said method comprising the steps of:

reducing said first predetermined interval in which said vertical blanking signal appears by a selected amount;

forming a plurality of line block signals from at least one of said plurality of horizontal scanning line signals;

shifting each line block signal on a time base so that each line block signal is displaced as one unit and in parallel without causing at least one of compression and expansion with respect to the time base;

generating at least one first blanking signal having a second predetermined interval, a respective one of the at least one first blanking signal being provided between adjacent line block signals;

forming video signals to be recorded having an occupied frequency bandwidth equal to that of said plurality of horizontal scanning like signals by connecting said line block signals and the at least one first blanking signal sequentially with respect to time, a length of the second predetermined interval of said at least one first blanking signal being selected such that the total sum of the second predetermined intervals over one vertical scanning period does not exceed said selected amount; and recording said video signals on the parallel oblique tracks on the magnetic tape with said plurality of rotary heads.

2. A video signal recording method according to claim 1, wherein said synchronizing signal includes a horizontal synchronizing signal of positive polarity having an amplitude which does not exceed a maximum value and a minimum value of an amplitude of said video information signal.

3. A video signal recording method according to claim 1, wherein said synchronizing signal includes a burst signal having information relating to a phase of said video information signal.

4. A video signal recording method according to claim 1, further comprising the step of adding a vertical synchronizing information signal into said reduced first predetermined interval in which said vertical blanking signal appears so as to record said video signal containing said vertical synchronizing information signal.

5. A video signal recording method according to claim 1, further comprising the step of adding a synchronizing information signal related to synchronizing information of said line block signal into the second predetermined interval of said at least one first blanking signal.

6. A video signal recording method according to claim 1, wherein said at least one first blanking signal is generated at a position preceding said at least one synchronizing signal.

7. A video signal recording method according to claim 5, wherein said synchronizing information signal includes a horizontal synchronizing signal of negative polarity.

8. A video signal recording method according to claim 5, wherein said synchronizing information signal includes a horizontal synchronizing signal and a burst signal.

9. A video signal recording method according to claim 1, further comprising the steps of:
forming reproduced video signals by reproducing said video signals recorded on said magnetic tape with said plurality of rotary heads;
shifting said line block signals included in said reproduced video signals in parallel as one unit on a time base;
removing said at least one first blanking signal between the adjacent line block signals;
connecting the line block signals with respect to time for each of said plurality of horizontal scanning lines; and
adding said selected amount of said reduced first predetermined interval of said vertical blanking signal for each vertical scanning period.

10. A video signal recording method for a magnetic recording and reproducing apparatus for recording and reproducing video signals including a plurality of horizontal scanning line signals, each of said horizontal scanning line signals having a video information signal, at least one synchronizing signal, and a vertical blanking signal having a first predetermined interval, said vertical blanking signal appearing at a vertical scanning period, said video signals being recorded onto and reproduced from parallel oblique tracks on a magnetic tape by utilizing a plurality of rotary heads, said method comprising the steps of:
reducing said first predetermined interval in which said vertical blanking signal appears by a selected amount;
dividing the video signals in one vertical scanning period into N line block signals (N being a positive integer), each line block signal being formed by at least one of said plurality of horizontal scanning line signals, and forming n segment block signals (n being a positive integer, n<N) using the N line block signals, each segment block signal including up to N/n line block signals;
shifting said each segment block signal on a time base so that each line block signal included in each segment block signal is displaced as one unit and in parallel with respect to said time base without causing at least one of compression and expansion of said time base;
generating at least one first blanking signal having a second predetermined interval, a respective one of the at least one first blanking signal being provided between adjacent line block signals;
connecting the line block signals and the at least one first blanking signal sequentially with respect to time;
shifting each segment block signal as one unit on said time base so that each segment block signal is displaced in parallel on said time base without causing compression and expansion of said time base;
generating at least one second blanking signal having a third predetermined interval, a respective one of the at least one second blanking signal being provided between adjacent segment block signals;
forming video signals to be recorded having an occupied frequency bandwidth equal to that of said plurality of horizontal scanning signals by connecting the segment block signals and the at least one second blanking signal sequentially with respect to time, a length of said second predetermined interval of said at least one first blanking signal and a length of said third predetermined interval of said at least one second blanking signal being selected such that the total sum of the second and third predetermined intervals over one vertical scanning period does not exceed said selected amount; and
recording said video signal on the parallel oblique tracks on the magnetic tape with said plurality of rotary heads.

11. A video signal recording method according to claim 10, further comprising the step of forming an overlap interval on the magnetic tape in which at least two of said plurality of rotary heads displaced at different angles with respect to each other are brought into contact with the magnetic tape simultaneously, and recording said video signals in a timed relationship in which said at least one second blanking signal contained in said video signals is positioned in said overlap interval.

12. A video signal recording method according to claim 10, wherein said synchronizing signal included in said line block signal includes a horizontal synchronizing signal of positive polarity having an amplitude which does not exceed a maximum value and a minimum value of an amplitude of said video information signal.

13. A video signal recording method according to claim 10, wherein said synchronizing signal included in said line block signal includes a burst signal related to a phase of said video information signal.

14. A video signal recording method according to claim 10, further comprising the step of adding a first synchronizing information signal related to synchronizing information of said line block signal into said second predetermined interval.

15. A video signal recording method according to claim 10, further comprising the step of adding a synchronizing information signal into the third predetermined interval of said at least one second blanking signal.

16. A video signal recording method according to claim 10, wherein a length of the third predetermined interval of said at least one second blanking signal is selected to be equal to a sum of the second predetermined interval of said first blanking signal and an interval of one line block signal.

17. A video signal recording method according to claim 10, further comprising the step of adding a vertical synchronizing information signal into said reduced first predetermined interval of said vertical blanking signal so as to record said video signal containing said vertical synchronizing information signal.

18. A video signal recording method according to claim 10, further comprising the steps of:
  generating reproduced video signals by reproducing the video signals recorded on said magnetic tape with said plurality of rotary heads;
  shifting each line block signal in said reproduced video signals as one unit in parallel on a time base;
  removing said at least one second blanking signal between said adjacent segment block signals and said at least one first blanking signal between said adjacent line block signals;
  connecting said line block signals with respect to time for each of said plurality of horizontal scanning signals; and
  adding said selected amount to said reduced first predetermined interval for every vertical scanning period continuously with respect to time.

19. A video signal recording method according to claim 18, further comprising the step of forming an overlap interval on the magnetic tape in which at least two of said plurality of rotary heads which are disposed at different angles with respect to each other are brought into contact with the magnetic tape simultaneously, and said video signals are recorded in a timed relationship in which said at least one second blanking signal contained in said video signals is positioned in said overlap interval.

20. A video signal recording method according to claim 19, further comprising the step of changing over said plurality of rotary heads within said third predetermined interval of said at least one second blanking signal included in the video signals recorded on said magnetic tape so as to form the continuous reproduced video signals.

21. A magnetic recording and reproducing apparatus for recording and reproducing video signals including a plurality or horizontal scanning line signals, each of said horizontal scanning line signals having a video information signal, at least one synchronizing signal, and a vertical blanking signal having a first predetermined interval, said vertical blanking signal appearing at a vertical scanning period, said video signals being recorded onto and reproduced from parallel oblique tracks on a magnetic tape by utilizing a plurality of rotary heads, said apparatus comprising:
  means for reducing said first predetermined interval in which said vertical blanking signal appears by a selected amount;
  means for forming a plurality of line block signals from at least one of said plurality of horizontal scanning line signals;
  means for shifting each line block signal on a time base so that each line block signal is displaced in parallel without causing compression and expansion with respect to said time base;
  means for generating at least one first blanking signal having a second predetermined interval, a respective one of the at least one first blanking signal being provided between adjacent line block signals;
  means for forming video signals to be recorded having an occupied frequency bandwidth equal to that of said plurality of horizontal scanning line signals by connecting the line block signals and the at least one first blanking signal sequentially with respect to time, a length of said second predetermined interval of said at least one first blanking signal being selected such that a total sum of said second predetermined intervals over one vertical scanning period does not exceed said selected amount; and
  means for recording said video on the parallel oblique tracks on the magnetic tape with said plurality of rotary heads.

22. A magnetic recording and reproducing apparatus according to claim 21, further comprising:
  means for forming reproduced video signals by reproducing said video signals recorded on said magnetic tape with said plurality of rotary heads;
  means for shifting each line block signal in said reproduced video signals as a unit in parallel on a time base;
  means for removing said at least one first blanking signal between adjacent line block signals;
  means for connecting the line block signals with respect to time for each of said plurality of horizontal scanning lines; and
  means for adding the selected amount to said reduced first predetermined interval for each vertical scanning period.

23. A magnetic recording and reproducing apparatus for recording and reproducing video signals including a plurality of horizontal scanning line signals, each of said horizontal scanning line signals having a video information signal, at least one synchronizing signal, and a vertical blanking signal having a first predetermined interval, said vertical blanking signal appearing at a vertical scanning period, said video signals being recorded onto and reproduced from parallel oblique tracks on a magnetic tape by utilizing a plurality of rotary heads, said apparatus comprising:
  means for forming an overlap interval on the parallel oblique tracks so that at least two of said plurality of rotary heads, which are mounted on a disk with different mounting angles with respect to each other, are simultaneously brought into contact with said magnetic tape in said overlap interval, said magnetic tape being wound about said disk at a predetermined wrap angle;
  means for reducing said first predetermined interval in which said vertical blanking signal appears by a selected amount;
  means for dividing the video signals in one vertical scanning period into N line block signals (N being a positive integer), each line block signal being formed by at least one of said plurality of horizontal scanning line signals;

means for forming n segment block signals (n being a positive integer, n<N), each segment block signal including up to N/n line block signals;

means for shifting said each segment block signal on a time base so that each line block signal included in each segment block signal is displaced as a unit in parallel on said time base without causing at least one of compression and expansion of said time base;

means for generating at least one first blanking signal having a second predetermined interval, a respective one of the at least one first blanking signal being provided between adjacent line block signals;

means for connecting the line block signals and the first banking signal sequentially with respect to time;

means for shifting each segment block signal as a unit on said time base so that each segment block signal is displaced in parallel on said time base without causing compression and expansion of said time base;

means for generating at least one second blanking signal having a third predetermined interval, a respective one of the at least one second blanking signal being provided between adjacent segment block signals;

means for forming video signals to be recorded having an occupied frequency bandwidth equal to that of said plurality of horizontal scanning signals by connecting the segment block signals and the at least one second blanking signal sequentially with respect to time, a length of the second predetermined interval of said at least one first blanking signal and a length of the third predetermined interval of said at least one second blanking signal being selected such that a total sum of the second and third predetermined intervals over one vertical scanning period does not exceed said selected amount; and means for recording said video signals on the parallel oblique tracks on the magnetic tape with said plurality of rotary heads.

24. A magnetic recording and reproducing apparatus according to claim 23, further comprising:

means for generating reproduced video signals by reproducing the video signals recorded on said magnetic tape with said plurality of rotary heads; and means for shifting in parallel as one unit each line block signal included in said reproduced video signals on a time base;

means for removing said at least one second blanking signal between adjacent segment block signals and said at least one first blanking signal between adjacent line block signals;

means for connecting said line block signals with respect to time for each of said plurality of horizontal scanning line signals; and means for adding the selected amount of said reduced first predetermined interval for every vertical scanning period.

* * * * *